(12) United States Patent
Lo et al.

(10) Patent No.: US 8,299,769 B2
(45) Date of Patent: Oct. 30, 2012

(54) MULTI-OUTPUT BUCK CONVERTING APPARATUS WITH SHUTDOWN PROTECTION

(75) Inventors: Cheng-Yi Lo, Taipei (TW); Kuo-Jung Lin, Taipei (TW)

(73) Assignee: Delta Electronics, Inc., Taoyuan County (TW)

( * ) Notice: Subject to any disclaimer, the term of this patent is extended or adjusted under 35 U.S.C. 154(b) by 414 days.

(21) Appl. No.: 12/774,940

(22) Filed: May 6, 2010

(65) Prior Publication Data
US 2011/0157946 A1 Jun. 30, 2011

(30) Foreign Application Priority Data
Dec. 31, 2009 (TW) .............................. 98146285 A

(51) Int. Cl.
*G05F 1/40* (2006.01)
(52) U.S. Cl. ....................................................... 323/282
(58) Field of Classification Search .................. 323/282, 323/284, 286, 271, 274; 361/18, 93.1, 93.8; 363/15
See application file for complete search history.

(56) References Cited

U.S. PATENT DOCUMENTS

| | | | | |
|---|---|---|---|---|
| 6,222,352 | B1* | 4/2001 | Lenk | 323/267 |
| 6,803,750 | B2* | 10/2004 | Zhang | 323/222 |
| 6,826,028 | B2* | 11/2004 | Schuellein | 361/93.1 |
| 6,879,138 | B2* | 4/2005 | Dinh et al. | 323/284 |
| 7,202,643 | B2* | 4/2007 | Miftakhutdinov | 323/224 |
| 7,397,230 | B2* | 7/2008 | Tabaian et al. | 323/284 |
| 7,541,794 | B2* | 6/2009 | Tabaian et al. | 323/284 |
| 2011/0157947 | A1* | 6/2011 | Lo et al. | 363/127 |

\* cited by examiner

*Primary Examiner* — Adolf Berhane
(74) *Attorney, Agent, or Firm* — Muncy, Geissler, Olds & Lowe, PLLC

(57) ABSTRACT

A multi-output buck converting apparatus with a shutdown protection includes a main buck converter and at least one auxiliary buck converter to provide multi-output voltages. The multi-output buck converting apparatus further includes an abnormal voltage signal generating unit. The abnormal voltage signal generating unit generates a control signal to control switch devices of the auxiliary buck converter when the multi-output buck converting apparatus shuts down. Therefore, the stored energy in the auxiliary buck converter can be released through internal loops or external loops with connected operational loads so as to avoid the recovering energy rebounding a main output voltage of the main buck converter.

6 Claims, 6 Drawing Sheets

MULTI-OUTPUT BUCK CONVERTING APPARATUS WITH SHUTDOWN PROTECTION

BACKGROUND OF THE INVENTION

1. Field of the Invention

The present invention relates to a buck converting apparatus, and more particularly to a multi-output buck converting apparatus with a shutdown protection.

2. Description of Prior Art

Due to the load demand of computer systems in computer system application technologies, a power supply usually provides different voltage levels by using buck converters. In order to make the computer system normally work, time sequences of controlling the different output voltages must be coordinated to each other. Because of inherent characteristics of the buck converter, the buck converter may be functioned as a boost converter; and, as a result that the output voltage rebounds to higher than the input voltage while shutting down the computer system. Under this condition, the abnormal output voltage will influence the time sequences required from the computer system so that the computer system can not be shut down normally.

Accordingly, a multi-output buck converting apparatus with a shutdown protection is provided to overcome problems of returning the stored energy and rebounding the main output voltage so that the multi-output buck converting apparatus can be shut down normally.

SUMMARY OF THE INVENTION

In order to solve above-mentioned problems, a multi-output buck converting apparatus with a shutdown protection is disclosed. The multi-output buck converting apparatus includes a main buck converter and at least one auxiliary buck converter to provide multi-output voltages; wherein the main buck converter has a main output terminal to provide a main output voltage to the ground, and the auxiliary buck converter is electrically connected to the main buck converter and has an upper-arm switch, a lower-arm switch, and an auxiliary output terminal to provide an auxiliary output voltage to the ground. The multi-output buck converting apparatus further include an abnormal voltage signal generating unit.

The abnormal voltage signal generating unit is electrically connected to an input terminal of the main buck converter to generate at least one control signal pair; wherein the control signal pair has an upper-arm control signal and a lower-arm control signal. The upper-arm control signal and the lower-arm control signal are not at high level simultaneously to control the upper-arm switch and the lower-arm switch, respectively, when the multi-output buck converting apparatus shuts down.

Therefore, the upper-arm switch and the lower-arm switch are controlled to release the energy stored in the auxiliary buck converter through internal discharging paths of the auxiliary buck converter or external loops with connected operational loads so as to avoid returning the energy to the main buck converter and rebounding the main output voltage.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1A:
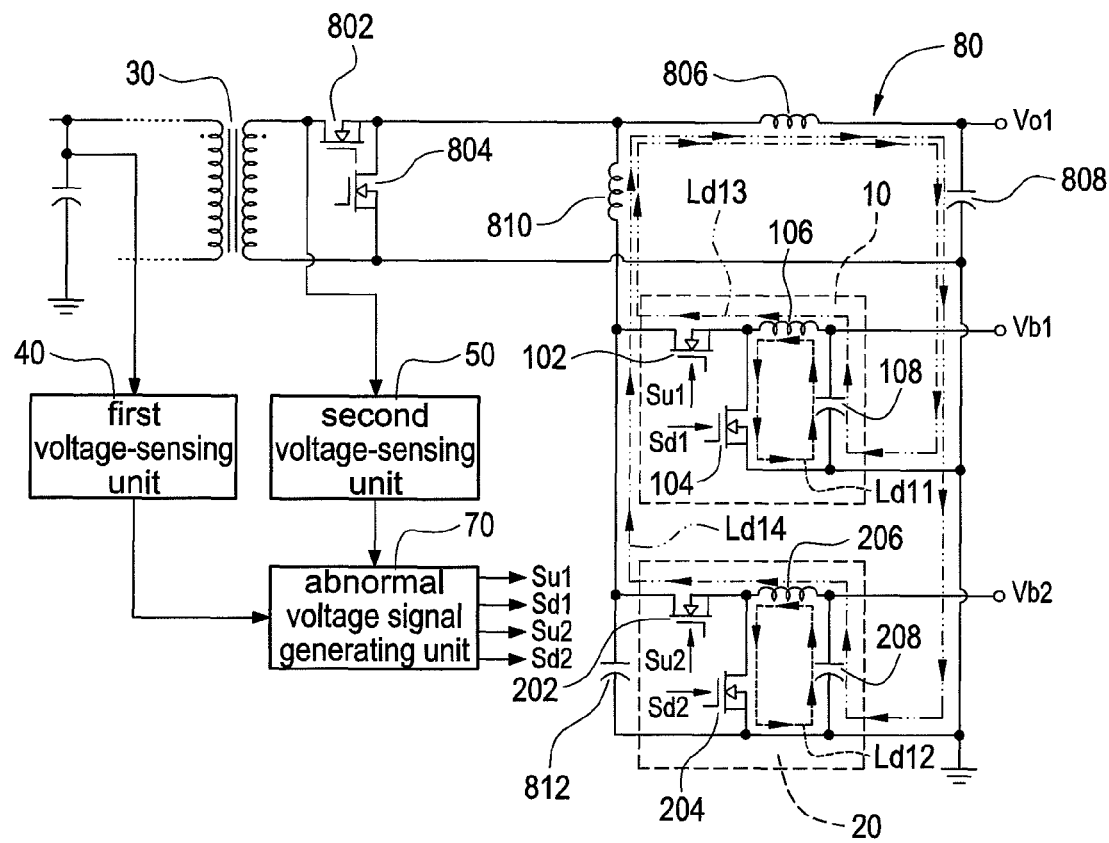
FIG. 1A is a circuit diagram of a first embodiment of a multi-output buck converting apparatus with a shutdown protection according to the present invention.

Reference will now be made to the drawing figures to describe the present invention in detail.

Figure 1B:
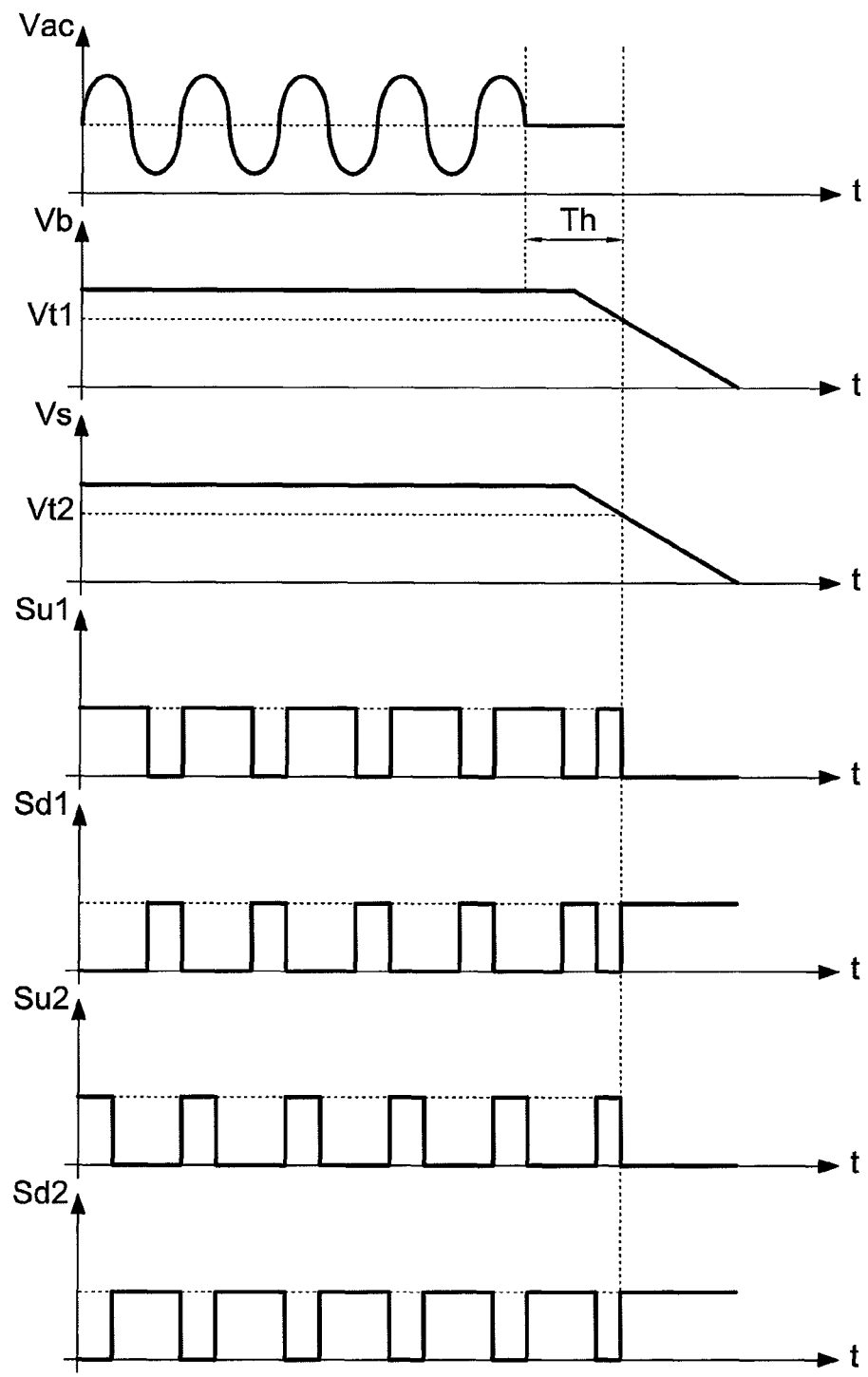
FIG. 1B is a timing diagram of shutting down the multi-output buck converting apparatus in the first embodiment.

Reference is made to FIG. 1A and FIG. 1B which are a circuit diagram of a first embodiment of a multi-output buck converting apparatus with a shutdown protection and a timing diagram of shutting down the multi-output buck converting apparatus in the first embodiment, respectively. The multi-output buck converting apparatus includes a main buck converter 80 and at least one auxiliary buck converter to provide multi-output voltages. In this embodiment, two auxiliary buck converters are exemplified for further demonstration. Namely, the multi-output buck converting apparatus includes a first auxiliary buck converter 10 and a second auxiliary buck converter 20. The main buck converter 80 has a main output terminal Vo1 to provide a main output voltage (not labeled) to the ground (not labeled). The first auxiliary buck converter 10 is electrically connected to the main buck converter 80 and has a first auxiliary output terminal Vb1 to provide a first auxiliary output voltage (not labeled) to the ground. More particularly, the main output voltage of the main buck converter 80 is higher than the first auxiliary output voltage of the first auxiliary buck converter 10. In addition, the second auxiliary buck converter 20 is electrically connected to the main buck converter 80 and has a second auxiliary output terminal Vb2 to provide a second auxiliary output voltage (not labeled) to the ground. More particularly, the main output voltage of the main buck converter 80 is higher than the second auxiliary output voltage of the second auxiliary buck converter 20.

The multi-output buck converting apparatus further includes an abnormal voltage signal generating unit 70, and the abnormal voltage signal generating unit 70 generates a plurality of control signal pairs (not labeled). In this example, two auxiliary buck converters are exemplified for further demonstration. Correspondingly, the abnormal voltage signal generating unit 70 generates two control signal pairs, namely a first control signal pair and a second control signal pair. More particularly, the first control signal pair has a first upper-arm control signal Su1 and a first lower-arm control signal Sd1. The second control signal pair has a second upper-arm control signal Su2 and a second lower-arm control signal Sd2. In addition, the first upper-arm control signal Su1 and the first lower-arm control signal Sd1 are complementary-level PWM signals when the multi-output buck converting apparatus does not shut down (under a normal operation). Namely, whenever the first upper-arm control signal Su1 is at a high level, the first lower-arm control signal Sd1 is at a low level, and vice versa. Similarly, the second upper-arm control signal Su2 and the second lower-arm control signal Sd2 are complementary-level PWM signals.

As shown in FIG. 1A, a front-end transformer 30 is electrically connected to the main buck converter 80 to provide an energy conversion between the primary side and the secondary side. The main buck converter 80 mainly has a main upper-arm switch 802, a main lower-arm switch 804, a main output inductor 806, a main output capacitor 808, an auxiliary inductor 810, and an auxiliary capacitor 812. The first auxiliary buck converter 10 mainly has a first upper-arm switch 102, a first lower-arm switch 104, a first output inductor 106, and a first output capacitor 108. The second auxiliary buck converter 20 mainly has a second upper-arm switch 202, a second lower-arm switch 204, a second output inductor 206, and a second output capacitor 208.

A detailed description of one circuit topology in the first embodiment is provided as follows. A first voltage-sensing unit 40 is electrically connected to a primary side of the transformer 30 to sense a primary-side voltage Vb of the transformer 30. The abnormal voltage signal generating unit 70 is electrically connected to the first voltage-sensing unit 40 and receives the primary-side voltage Vb to compare it with a first threshold voltage Vt1 (as shown in FIG. 1B). When the multi-output buck converting apparatus shuts down, an external AC voltage Vac stops the power supply to the multi-output buck converting apparatus. Because of an inherent characteristic of holding voltage for a capacitor, the primary-side voltage Vb gradually decreases in a hold-up time Th. When the primary-side voltage Vb is lower than the first threshold voltage Vt1, the first upper-arm switch 102 is opened and the first lower-arm switch 104 is closed by controlling the first upper-arm control signal Su1 and the first lower-arm control signal Sd1 at a low level and a high level, respectively.

A detailed description of another circuit topology in the first embodiment is provided as follows. A second voltage-sensing unit 50 is electrically connected to a secondary side of the transformer 30 to sense a secondary-side voltage Vs of the transformer 30. The abnormal voltage signal generating unit 70 is electrically connected to the second voltage-sensing unit 50 and receives the secondary-side voltage Vs to compare it with a second threshold voltage Vt2 (as shown in FIG. 1B). When the multi-output buck converting apparatus shuts down, an external AC voltage Vac stops the power supply to the multi-output buck converting apparatus. Because of an inherent characteristic of holding voltage for a capacitor, the secondary-side voltage Vs gradually decreases in a hold-up time Th. When the secondary-side voltage Vs is lower than the second threshold voltage Vt2, the first upper-arm switch 102 is opened and the first lower-arm switch 104 is closed by controlling the first upper-arm control signal Su1 and the first lower-arm control signal Sd1 at a low level and a high level, respectively.

However, the two above-mentioned examples of sensing voltages are for demonstration and not for limitation of the present invention. Furthermore, the voltage-sensing circuits depend on the developed topologies of the switching power supply.

A detailed description of a shutdown protection of the multi-output buck converting apparatus is provided as follows. When the multi-output buck converting apparatus shuts down, the energy stored in the first output capacitor 108 of the first auxiliary buck converter 10 can be released through a first discharging path Ld11. Namely, the stored energy does not return to the main output terminal Vo1 of the main buck converter 80 through a third discharging path Ld13. Furthermore, the energy stored in the first auxiliary buck converter 10 can be released through external loops with connected operational loads (not shown). More particularly, the first discharging path Ld11 is formed by the first output capacitor 108, the first output inductor 106, and the first lower-arm switch 104. Also, the third discharging path Ld13 is formed by the first output capacitor 108, the first output inductor 106, the first upper-arm switch 102, the auxiliary inductor 810, the main output inductor 806, and the main output capacitor 808.

Similarly, when the multi-output buck converting apparatus shuts down, the energy stored in the second output capacitor 208 of the second auxiliary buck converter 20 can be released through a second discharging path Ld12. When the multi-output buck converting apparatus shuts down, the energy stored in the first output capacitor 108 of the first auxiliary buck converter 10 can be released through a first discharging path Ld11. Namely, the stored energy does not return to the main output terminal Vo1 of the main buck converter 80 through a fourth discharging path Ld14. Furthermore, the energy stored in the second auxiliary buck converter 20 can be released through external loops with connected operational loads (not shown). More particularly, the second discharging path Ld12 is formed by the second output capacitor 208, the second output inductor 206, and the second lower-arm switch 204. Also, the fourth discharging path Ld14 is formed by the second output capacitor 208, the second output inductor 206, the second upper-arm switch 202, the auxiliary inductor 810, the main output inductor 806, and the main output capacitor 808.

Briefly speaking, the stored energy in the first auxiliary buck converter 10 and the second auxiliary buck converter 20 can be released through the internal discharging paths or external loops with connected operational loads to avoid returning the energy and rebounding the main output voltage when the multi-output buck converting apparatus shuts down.

Figure 2A:
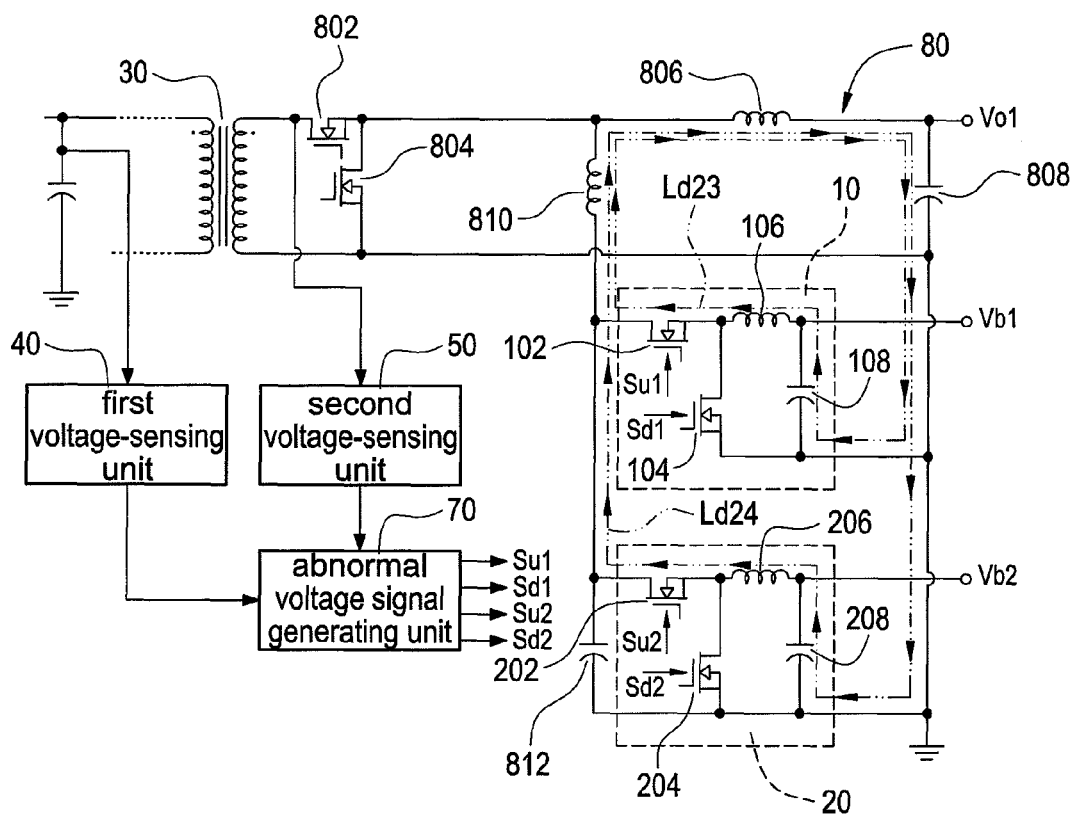
FIG. 2A is a circuit diagram of a second embodiment of a multi-output buck converting apparatus with a shutdown protection.
Figure 2B:
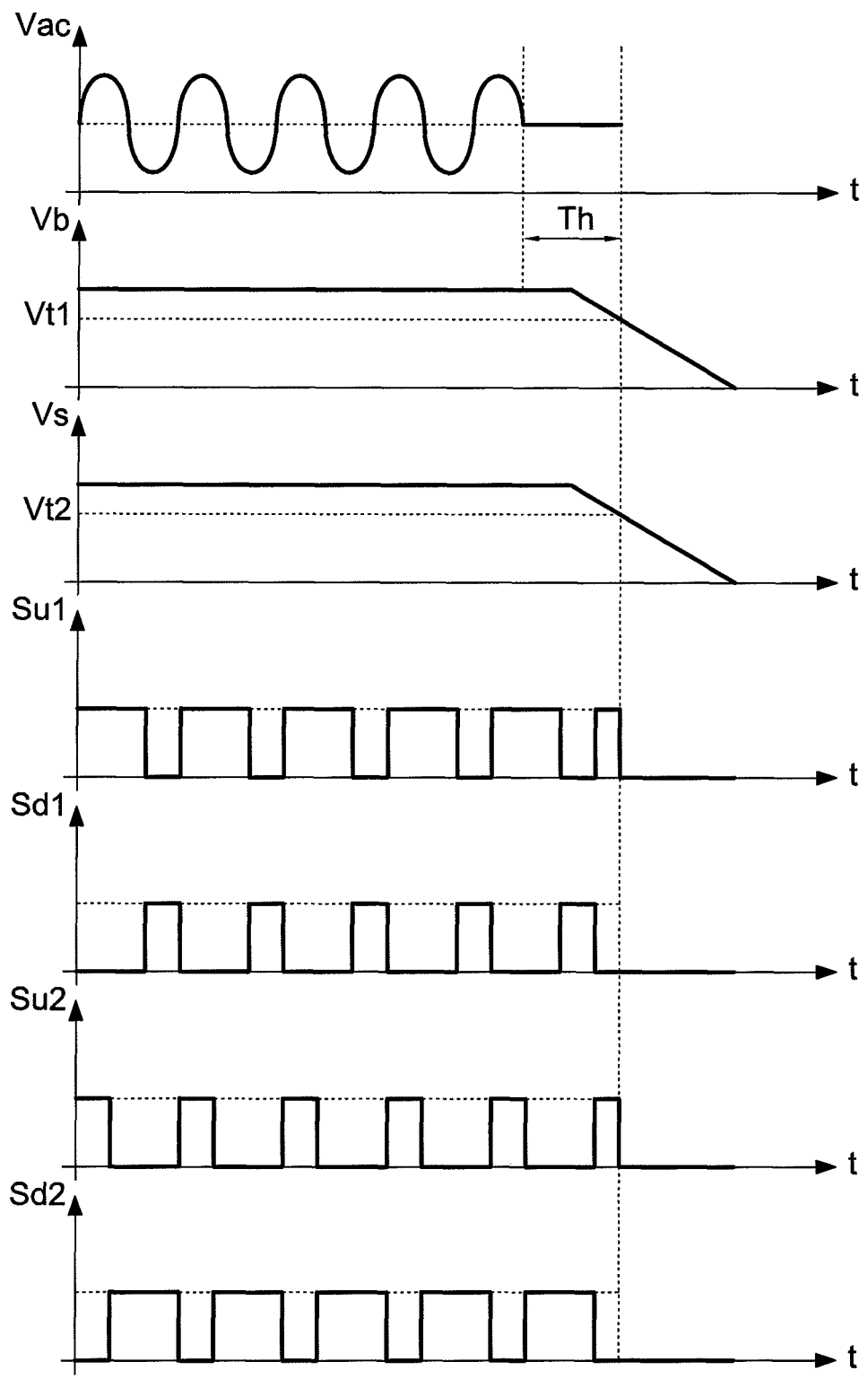
FIG. 2B is a timing diagram of shutting down the multi-output buck converting apparatus in the second embodiment.

Reference is made to FIG. 2A and FIG. 2B which are a circuit diagram of a second embodiment of a multi-output buck converting apparatus with a shutdown protection and a timing diagram of shutting down the multi-output buck converting apparatus in the second embodiment, respectively. The multi-output buck converting apparatus includes a main buck converter 80 and at least one auxiliary buck converter to provide multi-output voltages. In this embodiment, two auxiliary buck converters are exemplified for further demonstration. Namely, the multi-output buck converting apparatus includes a first auxiliary buck converter 10 and a second auxiliary buck converter 20. The main buck converter 80 has a main output terminal Vo1 to provide a main output voltage (not labeled) to the ground (not labeled). The first auxiliary buck converter 10 is electrically connected to the main buck converter 80 and has a first auxiliary output terminal Vb1 to provide a first auxiliary output voltage (not labeled) to the ground. More particularly, the main output voltage of the main buck converter 80 is higher than the first auxiliary output voltage of the first auxiliary buck converter 10. In addition, the second auxiliary buck converter 20 is electrically connected to the main buck converter 80 and has a second auxiliary output terminal Vb2 to provide a second auxiliary output voltage (not labeled) to the ground. More particularly, the main output voltage of the main buck converter 80 is higher than the second auxiliary output voltage of the second auxiliary buck converter 20.

The multi-output buck converting apparatus further includes an abnormal voltage signal generating unit 70, and the abnormal voltage signal generating unit 70 generates a plurality of control signal pairs (not labeled). In this example, two auxiliary buck converters are exemplified for further demonstration. Correspondingly, the abnormal voltage signal generating unit 70 generates two control signal pairs, namely a first control signal pair and a second control signal pair. More particularly, the first control signal pair has a first upper-arm control signal Su1 and a first lower-arm control signal Sd1. The second control signal pair has a second upper-arm control signal Su2 and a second lower-arm control signal Sd2. In addition, the first upper-arm control signal Su1 and the first lower-arm control signal Sd1 are complementary-level PWM signals when the multi-output buck converting apparatus does not shut down (under a normal operation). Namely, whenever the first upper-arm control signal Su1 is at a high level, the first lower-arm control signal Sd1 is at a low level, and vice versa. Similarly, the second upper-arm control signal Su2 and the second lower-arm control signal Sd2 are complementary-level PWM signals.

As shown in FIG. 2A, a front-end transformer 30 is electrically connected to the main buck converter 80 to provide an energy conversion between the primary side and the secondary side. The main buck converter 80 mainly has a main upper-arm switch 802, a main lower-arm switch 804, a main output inductor 806, a main output capacitor 808, an auxiliary inductor 810, and an auxiliary capacitor 812. The first auxiliary buck converter 10 mainly has a first upper-arm switch 102, a first lower-arm switch 104, a first output inductor 106, and a first output capacitor 108. The second auxiliary buck converter 20 mainly has a second upper-arm switch 202, a second lower-arm switch 204, a second output inductor 206, and a second output capacitor 208.

A detailed description of one circuit topology in the second embodiment is provided as follows. A first voltage-sensing unit 40 is electrically connected to a primary side of the transformer 30 to sense a primary-side voltage Vb of the transformer 30. The abnormal voltage signal generating unit 70 is electrically connected to the first voltage-sensing unit 40 and receives the primary-side voltage Vb to compare it with a first threshold voltage Vt1 (as shown in FIG. 2B). When the multi-output buck converting apparatus shuts down, an external AC voltage Vac stops the power supply to the multi-output buck converting apparatus. Because of an inherent characteristic of holding voltage for a capacitor, the primary-side voltage Vb gradually decreases in a hold-up time Th. When the primary-side voltage Vb is lower than the first threshold voltage Vt1, the first upper-arm switch 102 is opened and the first lower-arm switch 104 is opened by controlling the first upper-arm control signal Su1 and the first lower-arm control signal Sd1 both at a low level.

A detailed description of another circuit topology in the second embodiment is provided as follows. A second voltage-sensing unit 50 is electrically connected to a secondary side of the transformer 30 to sense a secondary-side voltage Vs of the transformer 30. The abnormal voltage signal generating unit 70 is electrically connected to the second voltage-sensing unit 50 and receives the secondary-side voltage Vs to compare it with a second threshold voltage Vt2 (as shown in FIG. 2B). When the multi-output buck converting apparatus shuts down, an external AC voltage Vac stops the power supply to the multi-output buck converting apparatus. Because of an inherent characteristic of holding voltage for a capacitor, the secondary-side voltage Vs gradually decreases in a hold-up time Th. When the secondary-side voltage Vs is lower than the second threshold voltage Vt2, the first upper-arm switch 102 is opened and the first lower-arm switch 104 is opened by controlling the first upper-arm control signal Su1 and the first lower-arm control signal Sd1 both at a low level.

However, the two above-mentioned examples of sensing voltages are for demonstration and not for limitation of the present invention. Furthermore, the voltage-sensing circuits depend on the developed topologies of the switching power supply.

A detailed description of a shutdown protection of the multi-output buck converting apparatus is provided as follows. When the multi-output buck converting apparatus shuts down, the energy stored in the first output capacitor 108 of the first auxiliary buck converter 10 can be released through external loops with connected loads (not shown) because the first upper-arm switch 102 and the first lower-arm switch 104 are both opened. Namely, the stored energy does not return to the main output terminal Vo1 of the main buck converter 80 through a third discharging path Ld23. More particularly, the third discharging path Ld23 is formed by the first output capacitor 108, the first output inductor 106, the first upper-arm switch 102, the auxiliary inductor 810, the main output inductor 806, and the main output capacitor 808.

Similarly, When the multi-output buck converting apparatus shuts down, the energy stored in the second output capacitor 208 of the second auxiliary buck converter 20 can be released through external loops with connected loads (not shown) because the second upper-arm switch 202 and the second lower-arm switch 204 are both opened. Namely, the stored energy does not return to the main output terminal Vo1 of the main buck converter 80 through a fourth discharging path Ld24. More particularly, the fourth discharging path Ld24 is formed by the second output capacitor 208, the second output inductor 206, the second upper-arm switch 202, the auxiliary inductor 810, the main output inductor 806, and the main output capacitor 808.

Briefly speaking, the stored energy in the first auxiliary buck converter 10 and the second auxiliary buck converter 20 can be released through external loops with connected operational loads to avoid returning the energy and rebounding the main output voltage when the multi-output buck converting apparatus shuts down.

Figure 3A:
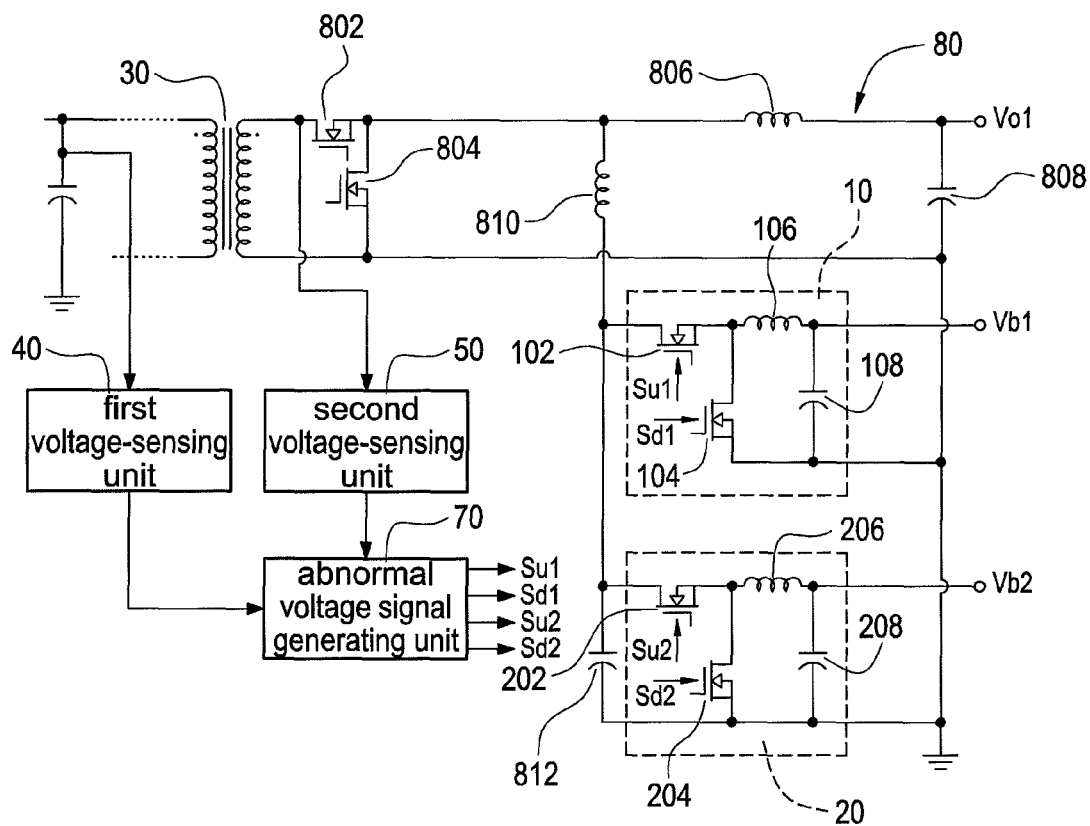
FIG. 3A is a circuit diagram of a third embodiment of a multi-output buck converting apparatus with a shutdown protection.
Figure 3B:
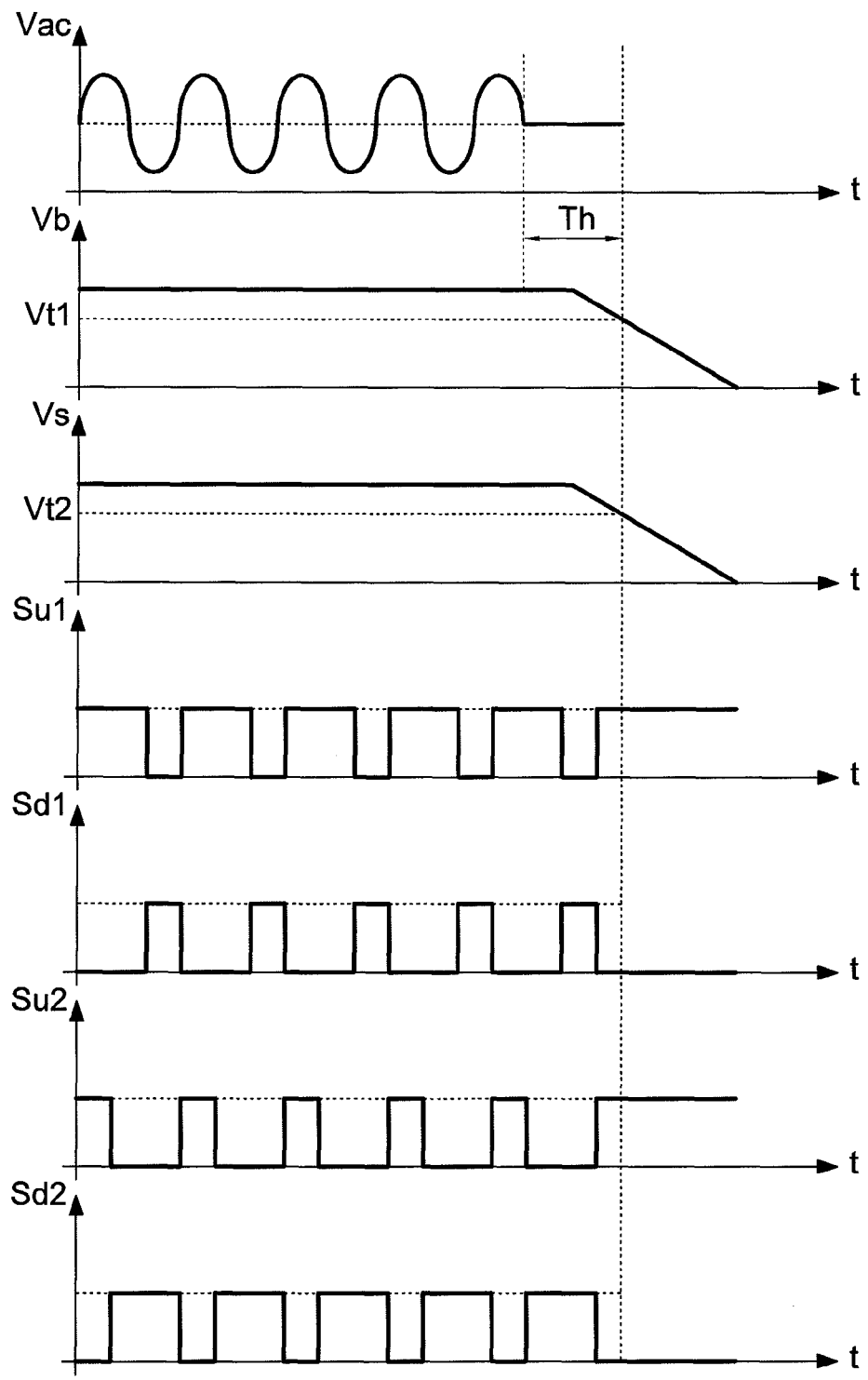
FIG. 3B is a timing diagram of shutting down the multi-output buck converting apparatus in the third embodiment.

Reference is made to FIG. 3A and FIG. 3B which are a circuit diagram of a third embodiment of a multi-output buck converting apparatus with a shutdown protection and a timing diagram of shutting down the multi-output buck converting apparatus in the third embodiment, respectively. The multi-output buck converting apparatus includes a main buck converter 80 and at least one auxiliary buck converter to provide multi-output voltages. In this embodiment, two auxiliary buck converters are exemplified for further demonstration. Namely, the multi-output buck converting apparatus includes a first auxiliary buck converter 10 and a second auxiliary buck converter 20. The main buck converter 80 has a main output terminal Vo1 to provide a main output voltage (not labeled) to the ground (not labeled). The first auxiliary buck converter 10 is electrically connected to the main buck converter 80 and has a first auxiliary output terminal Vb1 to provide a first auxiliary output voltage (not labeled) to the ground. More particularly, the main output voltage of the main buck converter 80 is higher than the first auxiliary output voltage of the first auxiliary buck converter 10. In addition, the second auxiliary buck converter 20 is electrically connected to the main buck converter 80 and has a second auxiliary output terminal Vb2 to provide a second auxiliary output voltage (not labeled) to the ground. More particularly, the main output voltage of the main buck converter 80 is higher than the second auxiliary output voltage of the second auxiliary buck converter 20.

The multi-output buck converting apparatus further includes an abnormal voltage signal generating unit 70, and the abnormal voltage signal generating unit 70 generates a plurality of control signal pairs (not labeled). In this example, two auxiliary buck converters are exemplified for further demonstration. Correspondingly, the abnormal voltage signal generating unit 70 generates two control signal pairs, namely a first control signal pair and a second control signal pair. More particularly, the first control signal pair has a first upper-arm control signal Su1 and a first lower-arm control signal Sd1. The second control signal pair has a second upper-arm control signal Su2 and a second lower-arm control signal Sd2. In addition, the first upper-arm control signal Su1 and the first lower-arm control signal Sd1 are complementary-level PWM signals when the multi-output buck converting apparatus does not shut down (under a normal operation). Namely, whenever the first upper-arm control signal Su1 is at a high level, the first lower-arm control signal Sd1 is at a low level, and vice versa. Similarly, the second upper-arm control signal Su2 and the second lower-arm control signal Sd2 are complementary-level PWM signals.

As shown in FIG. 3A, a front-end transformer 30 is electrically connected to the main buck converter 80 to provide an energy conversion between the primary side and the secondary side. The main buck converter 80 mainly has a main upper-arm switch 802, a main lower-arm switch 804, a main output inductor 806, a main output capacitor 808, an auxiliary inductor 810, and an auxiliary capacitor 812. The first auxiliary buck converter 10 mainly has a first upper-arm switch 102, a first lower-arm switch 104, a first output inductor 106, and a first output capacitor 108. The second auxiliary buck converter 20 mainly has a second upper-arm switch 202, a second lower-arm switch 204, a second output inductor 206, and a second output capacitor 208.

A detailed description of one circuit topology in the third embodiment is provided as follows. A first voltage-sensing unit 40 is electrically connected to a primary side of the transformer 30 to sense a primary-side voltage Vb of the transformer 30. The abnormal voltage signal generating unit 70 is electrically connected to the first voltage-sensing unit 40 and receives the primary-side voltage Vb to compare it with a first threshold voltage Vt1 (as shown in FIG. 3B). When the multi-output buck converting apparatus shuts down, an external AC voltage Vac stops the power supply to the multi-output buck converting apparatus. Because of an inherent characteristic of holding voltage for a capacitor, the primary-side voltage Vb gradually decreases in a hold-up time Th. When the primary-side voltage Vb is lower than the first threshold voltage Vt1, the first upper-arm switch 102 is closed and the first lower-arm switch 104 is opened by controlling the first upper-arm control signal Su1 and the first lower-arm control signal Sd1 at a high level and a low level, respectively.

A detailed description of another circuit topology in the third embodiment is provided as follows. A second voltage-sensing unit 50 is electrically connected to a secondary side of the transformer 30 to sense a secondary-side voltage Vs of the transformer 30. The abnormal voltage signal generating unit 70 is electrically connected to the second voltage-sensing unit 50 and receives the secondary-side voltage Vs to compare it with a second threshold voltage Vt2 (as shown in FIG. 3B). When the multi-output buck converting apparatus shuts down, an external AC voltage Vac stops the power supply to the multi-output buck converting apparatus. Because of an inherent characteristic of holding voltage for a capacitor, the secondary-side voltage Vs gradually decreases in a hold-up time Th. When the secondary-side voltage Vs is lower than the second threshold voltage Vt2, the first upper-arm switch 102 is closed and the first lower-arm switch 104 is opened by controlling the first upper-arm control signal Su1 and the first lower-arm control signal Sd1 at a high level and a low level, respectively.

However, the two above-mentioned examples of sensing voltages are for demonstration and not for limitation of the present invention. Furthermore, the voltage-sensing circuits depend on the developed topologies of the switching power supply.

A detailed description of a shutdown protection of the multi-output buck converting apparatus is provided as follows. When the multi-output buck converting apparatus shuts down, the energy stored in the first output capacitor 108 of the first auxiliary buck converter 10 can be released through external loops with connected loads (not shown) because the first lower-arm switch 104 is opened (even through the first upper-arm switch 102 is closed). Hence, the first auxiliary output voltage of the first auxiliary output terminal Vb1 is lower than the main output voltage of the main output terminal Vo1 so as to avoid returning the energy to the main buck converter 80 and rebounding the main output voltage.

Similarly, When the multi-output buck converting apparatus shuts down, the energy stored in the second output capacitor 208 of the second auxiliary buck converter 20 can be released through external loops with connected loads (not shown) because the second lower-arm switch 204 is opened (even through the second upper-arm switch 202 is closed). Hence, the second auxiliary output voltage of the second auxiliary output terminal Vb2 is lower than the main output voltage of the main output terminal Vo1 so as to avoid returning the energy to the main buck converter 80 and rebounding the main output voltage.

Briefly speaking, the stored energy in the first auxiliary buck converter 10 and the second auxiliary buck converter 20 can be released through external loops with connected operational loads to avoid returning the energy and rebounding the main output voltage when the multi-output buck converting apparatus shuts down.

In conclusion, the present invention has following advantages:

1. When the multi-output buck converting apparatus shuts down, the switch devices are controlled to provide internal discharging paths or external loops to release the energy so that the multi-output buck converting apparatus normally shuts down.

2. When the multi-output buck converting apparatus shuts down, the switch devices are controlled to avoid the energy returning to the main buck converter so that the multi-output buck converting apparatus normally shuts down.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-output buck converting apparatus with a shutdown protection comprising a main buck converter and at least one auxiliary buck converter to provide multi-output voltages; wherein the main buck converter has a main output terminal to provide a main output voltage to the ground, and the auxiliary buck converter is electrically connected to the main buck converter and has an upper-arm switch, a lower-arm switch, and an auxiliary output terminal to provide an auxiliary output voltage to the ground; the multi-output buck converting apparatus further comprising:

an abnormal voltage signal generating unit electrically connected to an input terminal of the main buck converter to generate at least one control signal pair; wherein the control signal pair has an upper-arm control signal and a lower-arm control signal, and the upper-arm control signal and the lower-arm control signal are not at high level simultaneously to control the upper-arm switch and the lower-arm switch, respectively, when the multi-output buck converting apparatus shuts down;

whereby the upper-arm switch and the lower-arm switch are controlled to release the energy stored in the auxiliary buck converter through internal discharging paths of the auxiliary buck converter or external loops with connected operational loads so as to avoid returning the energy to the main buck converter and rebounding the main output voltage.

2. The multi-output buck converting apparatus in claim 1, wherein the upper-arm switch is opened and the lower-arm switch is closed by controlling the upper-arm control signal and the lower-arm control signal at a low level and a high level, respectively, when an input voltage of the main buck converter is lower than a threshold voltage.

3. The multi-output buck converting apparatus in claim 1, wherein the upper-arm switch and the lower-arm switch are both opened by controlling the upper-arm control signal and the lower-arm control signal both at a low level, when an input voltage of the main buck converter is lower than a threshold voltage.

4. The multi-output buck converting apparatus in claim 1, wherein the upper-arm switch is closed and the lower-arm switch is opened by controlling the upper-arm control signal and the lower-arm control signal at a high level and a low level, respectively, when an input voltage of the main buck converter is lower than a threshold voltage.

5. The multi-output buck converting apparatus in claim 1, wherein the main output voltage of the main buck converter is higher than the auxiliary output voltage of the auxiliary buck converter.

6. The multi-output buck converting apparatus in claim 1, wherein the upper-arm control signal and the lower-arm control signal are complementary-level PWM signals when the multi-output buck converting apparatus does not shut down.

* * * * *